United States Patent
Whiten, III

(10) Patent No.: US 7,424,110 B1
(45) Date of Patent: Sep. 9, 2008

(54) WRIST CLIP

(75) Inventor: William a. c Whiten, III, 249 Indiana St., Park Forest, IL (US) 60466

(73) Assignee: William a. c Whiten, III, Park Forest, IL (US)

( * ) Notice: Subject to any disclaimer, the term of this patent is extended or adjusted under 35 U.S.C. 154(b) by 91 days.

(21) Appl. No.: 11/251,670

(22) Filed: Oct. 18, 2005

(51) Int. Cl.
*H04M 1/00* (2006.01)
(52) U.S. Cl. ............ 379/454; 379/455; 455/575.1
(58) Field of Classification Search ............ 379/433.1, 379/428.01, 429, 434, 90.01, 110.01, 454, 379/455; 455/575.1
See application file for complete search history.

(56) References Cited

U.S. PATENT DOCUMENTS

| 4,176,840 | A | * | 12/1979 | Lanning | 473/62 |
| 6,044,153 | A | * | 3/2000 | Kaschke | 379/433.01 |
| 6,212,414 | B1 | * | 4/2001 | Alameh et al. | 455/575.6 |
| 6,757,389 | B2 | * | 6/2004 | Firooz | 379/433.1 |
| 2003/0164389 | A1 | * | 9/2003 | Byers | 224/221 |
| 2006/0166720 | A1 | * | 7/2006 | Dixon | 455/575.6 |

\* cited by examiner

*Primary Examiner*—Curtis Kuntz
*Assistant Examiner*—Tuan D Nguyen

(57) ABSTRACT

The Wrist Clip is made out of both sides of a watchband. The left side has a strap with holes in it, and the right side has a clasp, which fastens together with the left side to hold The Wrist Clip together. The watchbands are made out of white gold, platinum, leather, stainless steel or plastic. The case, which holds the phone, can be any of the available types listed above depending on the consumer. There's a plastic disc, which is screwed into the phone case in the center. The left band is screwed into the left side of the disc located in the center of the case. The right band is screwed into the right side of the disc located in the center of the case. This allows the consumer to wear it on his or her wrist. The phone is placed in the desirable phone case nice and tight so the phone is secure and ready for use.

1 Claim, 5 Drawing Sheets

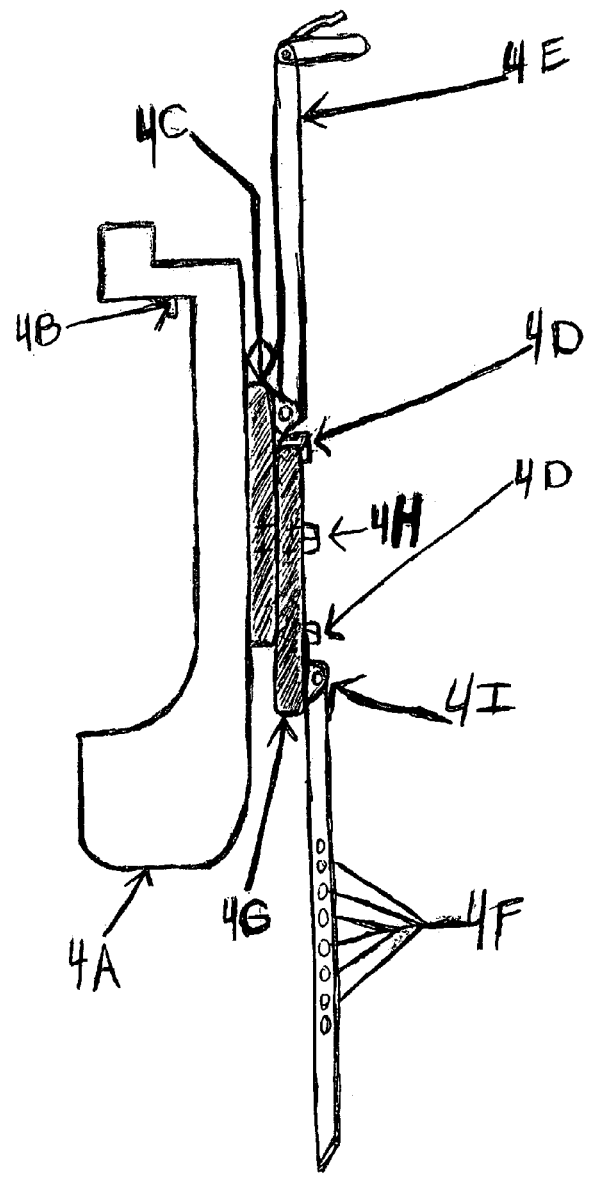

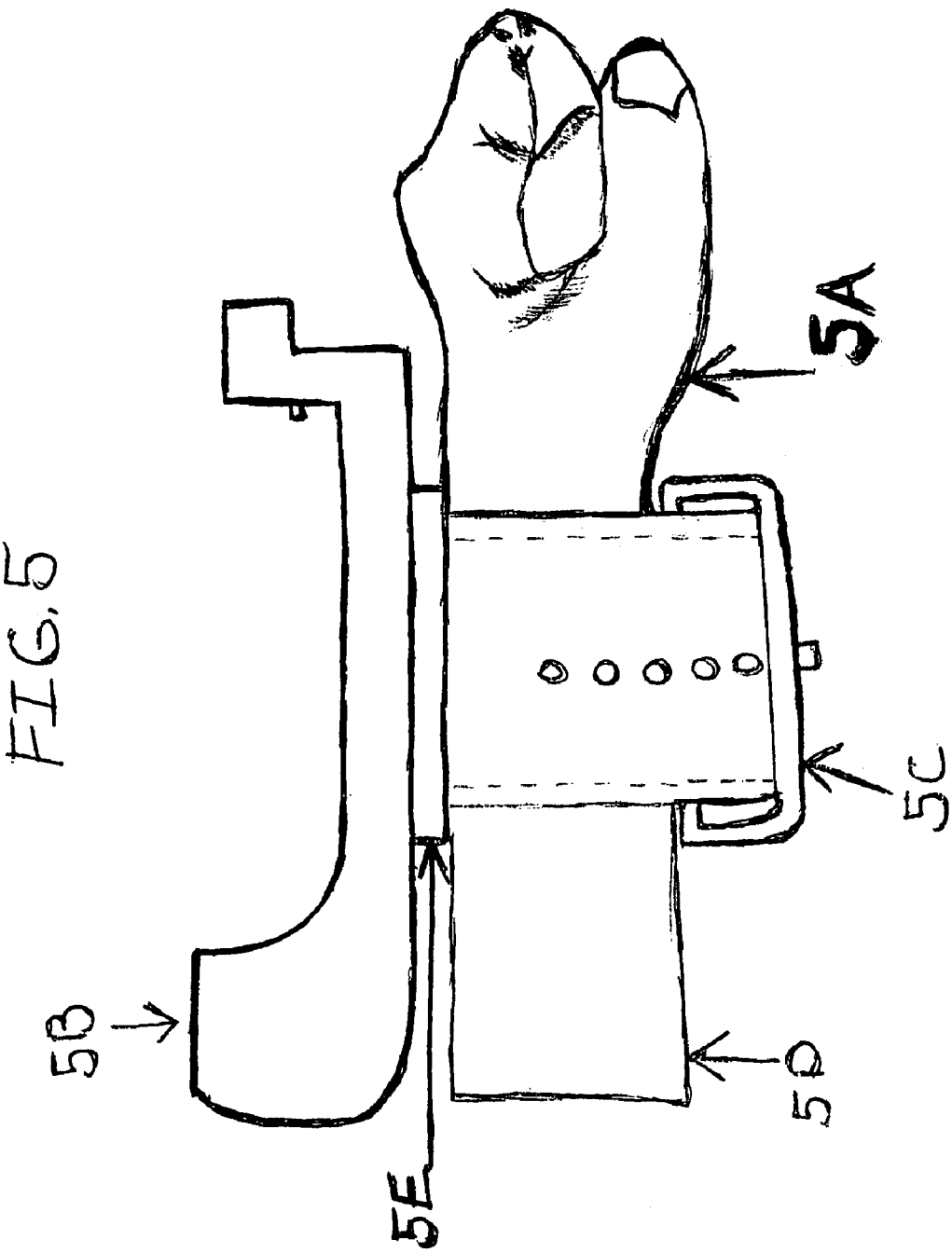

WRIST CLIP

FIELD OF INVENTIONS

The wrist clip is a device that holds and protects the cell phone on the user's wrist. The user can talk while he or she drive's a car, or operate a jet ski. A nurse or a doctor can communicate with each other while the nurse is at the bedside with her patient without worrying about holding the phone.

The Wrist Clip works with phones that are speaker able. The phone is placed in the clip that fits the user's phone, then strapped together with watchband and other materials. This way it is safe and manageable for the user around the wrist. Now the user can answer the phone using the speaker to talk and still have both hands free to drive a car, boat, or any work while hands are free.

The design features options like diamond studded wrist clips can be special ordered with the help of "Jacob the Jeweler", Micheal V., or "The Ice Man", but only with my o.k. (William a.c. Whiten III). The clip can also be put on chains that can hang from the user's neck. The Wrist clip will help eliminate things like car crashes that happen while people are trying to hold the phone to talk while driving. Mothers that need to monitor their children in a dangerous situation so that they may still be able to call the police. With this device, you can talk and take care of business while at the same time having both hands free. The Wrist Clip can also appeal to actors, rappers, congressmen, attorneys, and secretaries.

This idea came about because I was tired of my phone dropping, and rubbing against my face forming acne (rash). I was also tired of reaching for my phone on my belt clip.

The invention of earpieces were good and it will allowed you to be hands free, yet The Wrist Clip provides an alternative for being hands free and safe.

BACKGROUND OF THE INVENTION

One of the most explosive new technologies to come out of the last twenty years is the cellular telephone. In 1994, 16 million Americans subscribed to cellular phone services. By 2001, that number had ballooned to more than 110 million, and still shows no signs of slowing down. In fact, some experts predict that worldwide subscription will reach 1.2 billion people by 2005. The basic concept of cellular phones began in 1947, when AT&T researchers sought ways to increase the traffic capacity and frequency of mobile communication in police car radios. However, non-existing technology and stringent FCC authorized commercial cellular phone use. As a result of this regulation, the scientific advances of the intervening years and increased competition among communication companies put the cellular phone on the fast track. Today's widespread use of these revolutionary devices is uprising, since they now offer a virtually endless array of benefits. In addition to serving as a practical means of communication while on the go, technological advances have evolved cell phones into mini computers, capable of keeping consumers abreast to the latest stock quotes, providing wireless Internet access, and delivering local weather updates, cellular and digital telephones have become practically indispensable to millions the world over.

The market is currently flooded with cell phone accessories that seek to make use of these handy units even more convenient. Compact headsets, featuring a speaker that can be affixed to the ear in addition to an integrally attached mouthpiece, are designed for consumers with busy schedules. Freeing the hands from the holding unit, headsets allow cell phone users to conduct business or personal conversations while attending to other tasks. Additionally, belt clips for encasing devices are very practical, providing a housing unit when it is not in use and a sturdy means of storage when the phone is used in conjunction with the headset. However, the convenience of belt clip cell phone cases is not without drawbacks. In fact, most consumers may find them awkward and cumbersome. Bulky and unyielding, these clips tend to cause discomfort while sitting at a desk or behind the wheel of a car. Most models of belt clips also encase the cell phone so tightly that a simple task of answering a ring can be daunting. Having to wrestle with the clip to free the phone, valuable time could be lost and important calls missed. Moreover, this "challenging" retrieval of the phone could cause the user to accidentally drop it, marring the surface, or worse, damaging the unit beyond repair. Even those who utilize headsets to answer and place calls also risk breaking this expensive equipment. Busily walking about, the user could inadvertently bump into an inanimate object or another person. Since the phone is exposed on the side of the body, such collisions can cause the unit to be wrenched from its casing, pull loose from headset plug, and crash to the floor. Additionally, belt clips are not practical for use by everyone, especially professional women. Wearing sensible business attire in the workplace such as gabardine slacks and linen skirts, women employed in office environments typically do not wear belts that would make a clip a viable option. Considering that cellular phones are becoming more and more necessary, convenient and reliable means of managing and maintaining these units have become especially important.

Recognizing the potential for a product that would provide a more practical and user-friendly method of using and storing a cellular telephone while on the go, Mr. William Whiten III has conceived a clever product invention he has aptly designated the Wrist Clip. Simply stated, the Wrist Clip is a wearable band that is designed to secure a cellular telephone to the wrist. This band can be fabricated of durable yet comfortable leather or nylon material, with adjustable holes and a corresponding hook buckle to provide a secure and easy fit. Although not specified as of yet, the clip unit of the portion can be a plastic or metal fastener, configured with a corresponding hook for an existing cellular telephone. Fashionable and attractive, the Wrist Clip could be produced in a variety of colors to match most styles of clothing. The inventor has also suggested expanding this idea to include chains or straps that can be worn around the neck.

Use of the Wrist Clip would be very simple and straightforward. First, the user would select a wristband based on personal preference of color. By way of example, a construction worker may want a basic brown clip or black unit that is simply serviceable. Similarly, a female executive may desire a plum-colored band to accentuate her newest business suit. Next, the user would attach a cell phone to the Wrist Clip by simply following package instructions. Then the user would don the unit as one would a wristwatch, adjusting and securing the band to the wrist. With the phone secured to the body in such a manner, the user need only to flip open the cover of the device should it ring or become necessary to place a call. When desired, the Wrist Clip could be easily removed from the waist and stored until needed again.

The Wrist Clip would offer consumers many significant benefits and advantages. Foremost, this cleverly designed device would provide a sturdy and simple means of securing a cellular telephone to the body. Creatively appropriating a wristwatch-type design, the Wrist Clip would ensure that costly cellular equipment would not be broken or destroyed. Additionally, there would be no risk of the phone being lost or stolen, as users would have their devices with them at all times. Heavy-duty yet flexible, the adjustable band of the Wrist Clip could be positioned to comfortably fit virtually any body size, from petite young women to burly, heavyset truck drivers. As the phone itself would be within easy reach at all times, users would be able to receive and place calls in a matter of seconds. This feature would make the Wrist Clip particularly beneficial for motorists, eliminating the need to juggle a handheld cell phone when they should be concentrating on their driving. Moreover, consumers would not have to cradle a phone between their ear and shoulder while talking, facilitating comfortable conversation even while busy attending to other tasks. Rendering obsolete the need for belts or similar anchors necessary for plastic clips, the Wrist Clip could be used by anyone with a cellular telephone with speakerphone capabilities, regardless of what they were wearing. Manufactured of durable, high quality materials and easily adaptable to new phone upgrades, the Wrist Clip should provide years of continual use.

The Wrist Clip is a practical product invention, which would enable consumers to keep their cell phones with them at all times, whether at work or play. Ensuring that expensive cellular equipment is secure yet accessible, this innovative product would save users valuable time and more importantly, high replacement costs. Affordably priced, the Wrist Clip should be well received by the vast number of consumers who depend on cellular telephones, an extremely sizable market potential.

BRIEF DESCRIPTION OF THE DRAWING

FIG. 4 is the detail of the side view of the wrist clip device.
FIG. 5 is the wrist clip device attached to a user's wrist.

DETAILED DESCRIPTION OF THE PREFERRED EMBODIMENTS

Figure 1:
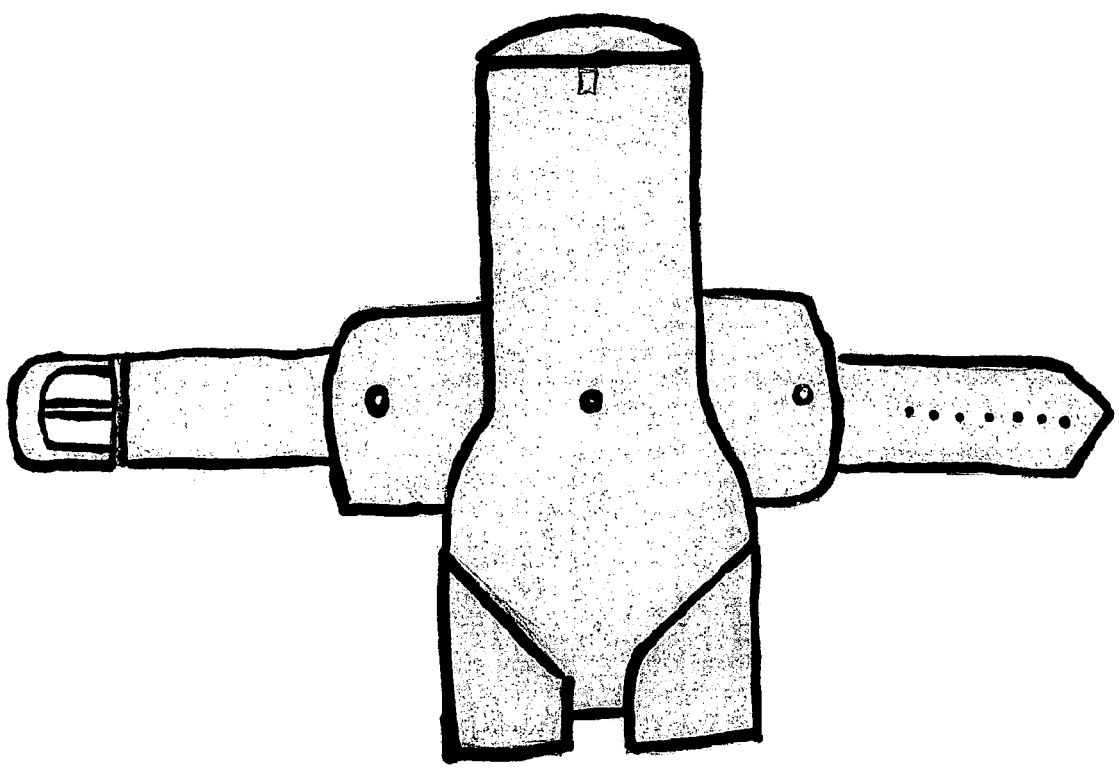
FIG. 1 is the front view of a wrist clip device.

In FIG. 1, you see the phone case with the watchbands fully extended on both sides to show a horizontal picture of the Wrist Clip. FIG. 1 also shows the three screws parallel to each other, which helps out securing the watchbands to the plastic motion device. The screw in the middle of the phone case also helps secure the plastic motion disc-like device located on the back of the Wrist clip.

Figure 2:
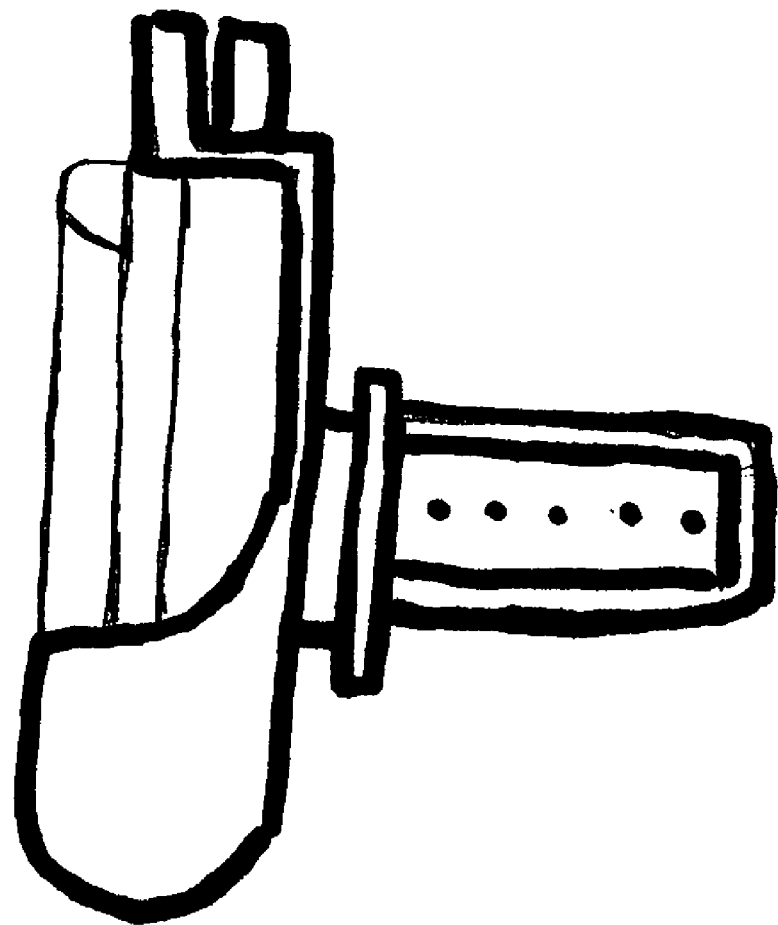
FIG. 2 is the side view of the wrist clip device with a cell phone in place.

FIG. 2 shows how the motion disc device and the watchbands look when they are together.

Figure 3:
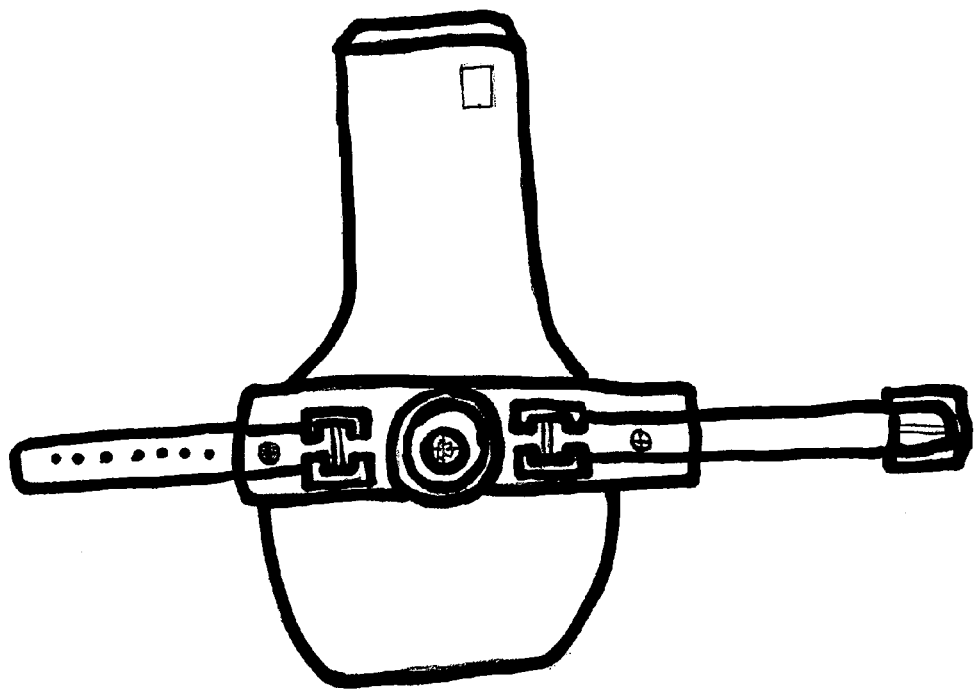
FIG. 3 is the back view of the wrist clip device.

In FIG. 3, you see how the back of the Wrist Clip looks. FIG. 3 shows how both watchbands, the plastic motion disc device located in the center of the phone case, plus the 3 screws and 2 pins look as a unit. FIG. 3 shows a horizontal picture of how watchbands look securing it in place on the left side of the motion disc. FIG. 3 also shows a picture on how the screw secures the right side of the motion disc too. In FIG. 3, you can see how the screw in the middle is positioned to hold the plastic disc together. In FIG. 3, you can also see pins are placed between the pin holders located on the right and left side of the plastic motion disc.

In FIG. 4 you see how the Wrist Clip looks from the side with no phone present. In FIG. 4, 4a is a side view of the outside of the clip at a 180 degree turn, 4b is the mount at the top of the clip where the top of the phone is helped to lock the phone in place. 4c is the first plastic piece of the motion device which is placed against the center behind the clip, before placing the second hard plastic piece directly on top of the first hard plastic piece of the motion device. 4d are the screws that hold the leather bands to the plastic pieces of the motion device. 4e in FIG. 4 is the leather band which has the clasp at the end of it. 4f in FIG. 4 is the leather band which has the holes in it so that the clasp of 4e goes to secure the two bands together. 4g in FIG. 4, is the second plastic piece of the motion device that is placed directly on top of the first plastic piece in the center of the clip. 4h in FIG. 4 is the one screw that is screwed through 4c and 4g which are the to plastic pieces that make up the motion device behind the center of the clip. 4i in FIG. 4 are the pin and pin holder which are used for aiding the screw by holding the leather bands together with the plastic piece known as the motion device.

In FIG. 5, you can see how the Wrist Clip looks from the side, with no phone present. In FIG. 5, 5a is the wrist of a wearer sporting the Wrist Clip. 5b in FIG. 5 is the clip at a 90 degree turn on the wearer's wrist. 5c in FIG. 5 are both leather bands fastened together on the wearer's wrist. 5d in FIG. 5 is simply the arm of the wearer. 5e in FIG. 5 is the motion device of the Wrist Clip where both leather bands are attached together.

PATENTS DISCOVERED DURING THE SEARCH

Several references uncovered in the search show wrist mounted cellular phones. U.S. Pat. No. 6,212,414 to Alameh appears to show a wrist worn radio telephone with display, battery and flexible adjustable wristband. U.S. Pat. No. 6,757,389 to Firooz appears to show a wrist worn telephone apparatus with a battery powered cellular device and a wrist wrapped strap. D358,553 to Murakami appears to show an ornamental design for a wristwatch radio telephone.

What is claimed is:

1. A wrist clip device for a cell phone comprising: a case; a left and a right leather band that are fully extended on the left and right sides of said case; wherein one of said right and said left leather band has eight small holes for fitting a metal clasp; a plastic motion disc device located in the center of said case; wherein said plastic motion disc device has a first and a second hard plastic disc that are overlapping each other; a first screw for securing said first and said second hard plastic disc together and attaching to said case and said plastic motion disc device provided a swivel motion; two pins, two pin holders, a second and a third screw for attaching said left and right leather band to said plastic motion disc device and wherein said case is provided for a snap fit with said cell phone.

* * * * *